US008595772B2

(12) United States Patent
Jacobson et al.

(10) Patent No.: US 8,595,772 B2
(45) Date of Patent: Nov. 26, 2013

(54) SYSTEM AND METHOD FOR RECALLING MULTIPLE LAST TELEVISION CHANNELS VIEWED

(75) Inventors: Neil A. Jacobson, San Antonio, TX (US); Mark A. Elias, Eastpointe, MI (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 662 days.

(21) Appl. No.: 12/188,318

(22) Filed: Aug. 8, 2008

(65) Prior Publication Data

US 2010/0037257 A1 Feb. 11, 2010

(51) Int. Cl.
*H04N 5/445* (2011.01)
(52) U.S. Cl.
USPC .............. 725/58; 725/32; 725/38; 725/133; 725/134; 725/142
(58) Field of Classification Search
USPC ................ 725/58, 134, 133, 142, 38, 32
See application file for complete search history.

(56) References Cited

U.S. PATENT DOCUMENTS

| | | | |
|---|---|---|---|
| 7,818,766 B2 * | 10/2010 | Ludvig et al. | 725/38 |
| 2001/0017672 A1 | 8/2001 | Verhaeghe | |
| 2002/0168178 A1 * | 11/2002 | Rodriguez et al. | 386/92 |
| 2003/0148731 A1 | 8/2003 | Onomatsu et al. | |
| 2003/0161395 A1 * | 8/2003 | Byers | 375/240.01 |
| 2004/0034866 A1 | 2/2004 | Yuen et al. | |
| 2004/0172651 A1 * | 9/2004 | Wasilewski et al. | 725/46 |
| 2005/0062895 A1 | 3/2005 | Tsubokawa et al. | |
| 2005/0094733 A1 | 5/2005 | Daniell | |
| 2006/0150120 A1 * | 7/2006 | Dresti et al. | 715/810 |
| 2007/0009229 A1 * | 1/2007 | Liu | 386/83 |
| 2007/0079330 A1 | 4/2007 | Ludvig et al. | |
| 2008/0163290 A1 * | 7/2008 | Marko | 725/32 |

* cited by examiner

*Primary Examiner* — Jivka Rabovianski
(74) *Attorney, Agent, or Firm* — Guntin & Gust, PLC; Ed Guntin (57) ABSTRACT

A set-top box device comprising a recall channel stack module and an output module. The recall channel stack module is configured to store a plurality of last channels displayed. The output module is in communication with the recall channel stack module, and is configured to output a last channel menu listing the plurality of last channels displayed based on a last channel request.

18 Claims, 7 Drawing Sheets

SYSTEM AND METHOD FOR RECALLING MULTIPLE LAST TELEVISION CHANNELS VIEWED

FIELD OF THE DISCLOSURE

The present disclosure generally relates to communications networks, and more particularly relates to a system and method for recalling multiple last television channels viewed.

BACKGROUND

Many televisions and set-top box devices allow a user to toggle between two television channels without having to reenter the channel numbers associated with the television channels or having to press a channel up/down button multiple times. Additionally, every time the user selects a new television channel, the last channel viewed is updated.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
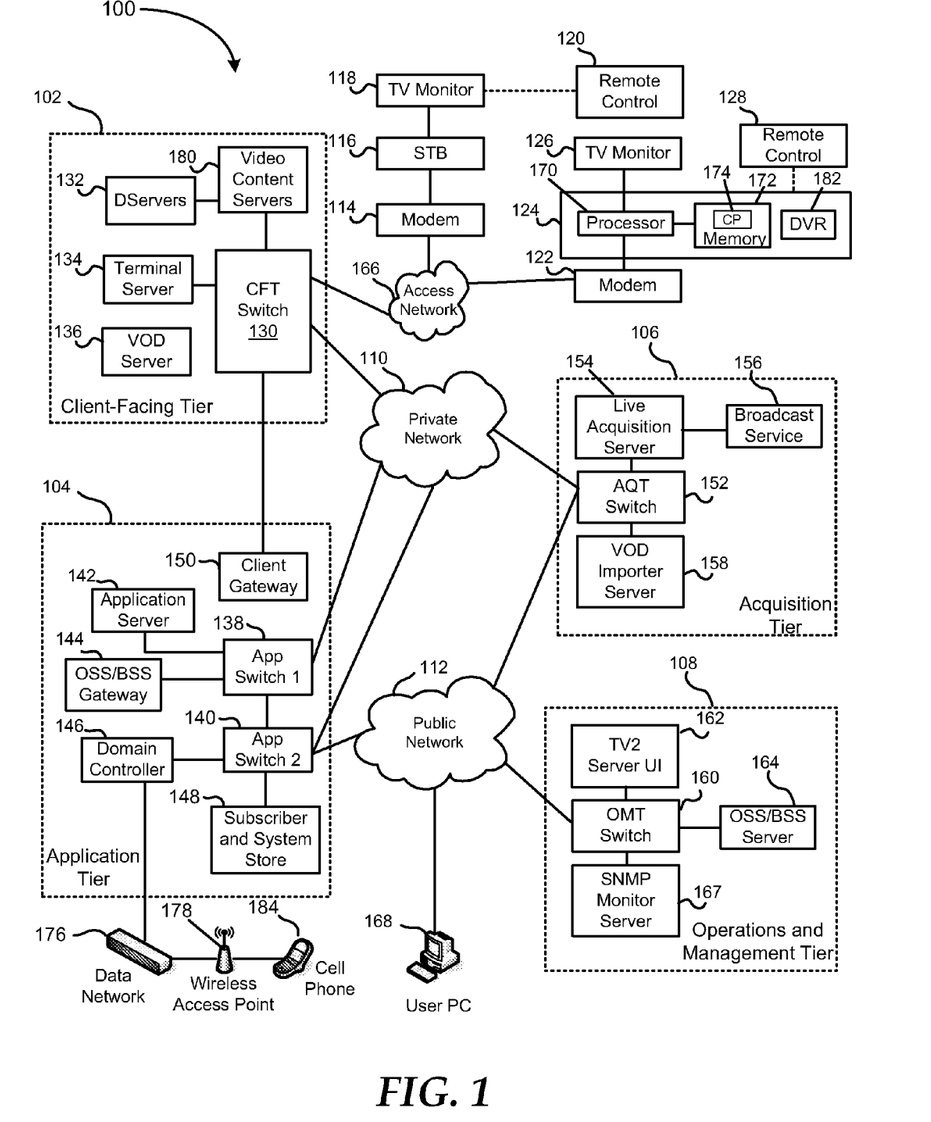
FIG. 1 is a block diagram illustrating an Internet Protocol Television (IPTV) network.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft™ TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The set-top box computer program 174 can contain instructions to receive many types of user preferences from the domain controller 146 via the access network 166. For example, the set-top box computer program 174 can include instructions to receive a request to record at least one television program at a video content storage module such as a digital video recorder (DVR) 182 within the second set-top box device 124. In this example embodiment, the set-top box computer program 174 can include instructions to transmit the request to the DVR 182, where the television program(s) are recorded. In an illustrative embodiment, the set-top box computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

Figure 2:
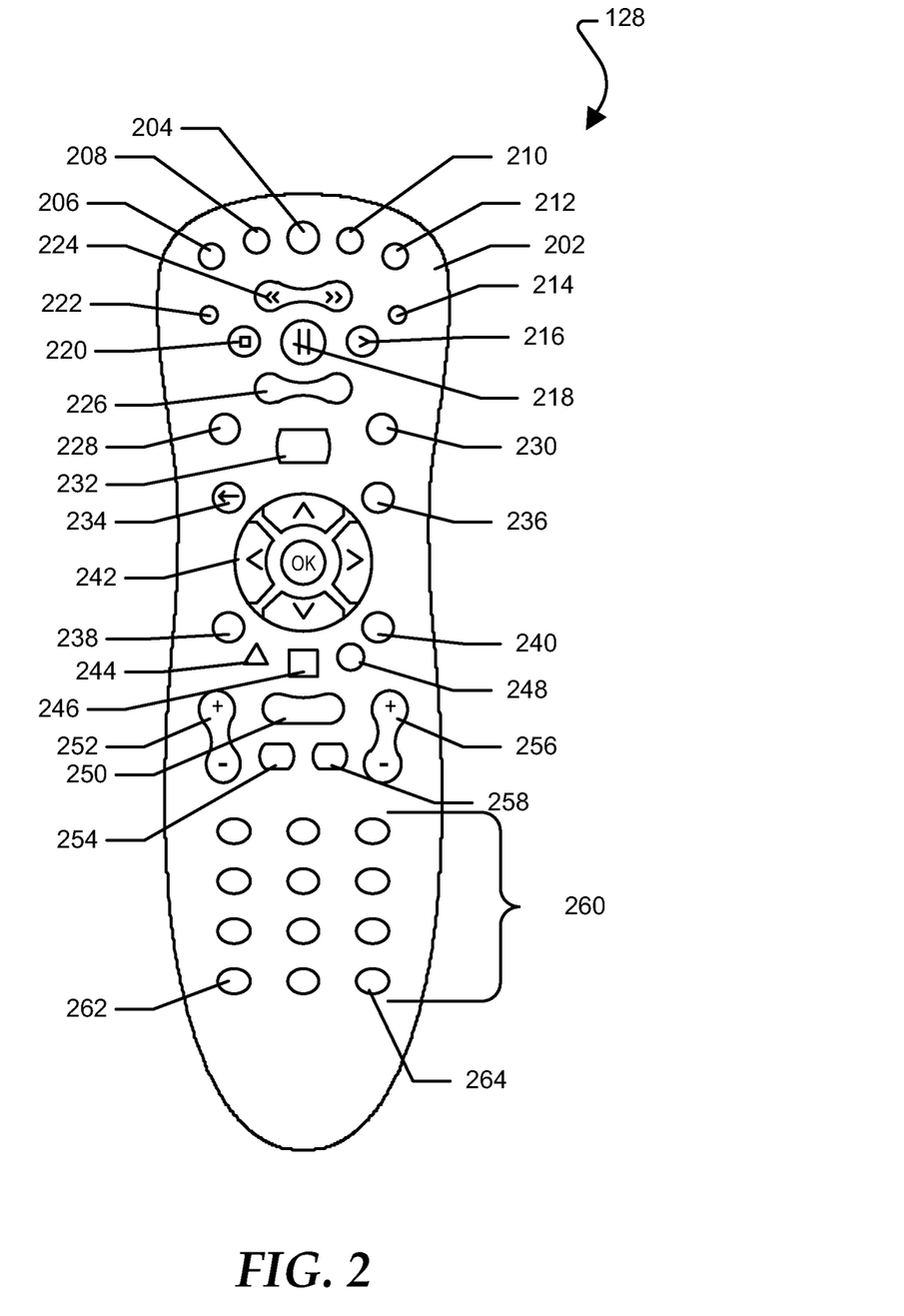
FIG. 2 is a plan view of a remote control device.

FIG. 2 shows the remote control device 128 including a housing 202 having a plurality of buttons. For example, the remote control device 128 can include a power button 204, an IPTV button 206, a television (TV) button 208, a digital video disc (DVD) button 210, and an auxiliary (AUX) button 212. When the IPTV button 206 is pressed, the remote control device 128 can be used to control the second set-top box device 124. When the TV button 208 is pressed, the remote control device 206 can be used to control the display device 126 connected to the second set-top box device 124. When the DVD button 210 is pressed, the remote control device 128 can be used to control a DVD player connected to the display device 126 or to the second set-top box device 124. Additionally, when the AUX button 212 is pressed, the remote control device 128 can be used to control an auxiliary device connected to the display device 126 or to the second set-top box device 124. For example, the auxiliary device can be a compact disc (CD) player, a video cassette recorder (VCR), an audio receiver, or some other home entertainment device.

The remote control device 128 can include a TV/VIDEO button 214 that can be used to toggle between inputs for display, such as between television content and video content from the DVR or the DVD player. The remote control device 128 can also include a PLAY button 216, a PAUSE button 218, a STOP button 220, a RECORD button 222, a rewind (REW)/fast forward (FF) button 224, and a replay/slow forward (FWD) button 226. These buttons can be used to control the content received at the second set-top box device 124 or video content received from a DVD player. One or more of these buttons can also be programmed to control the CD player, the VCR, or some other home entertainment device. The remote control device 128 can also include a VIDEO ON DEMAND button 228 and a RECORDED TV button 230. The VIDEO ON DEMAND button 228 can be pressed in order to access VoD content available via the second set-top box device 124. The RECORDED TV button 230 can be pressed in order to access television content recorded at the second set-top box device 124.

The remote control device 128 can also include a MENU button 232, a BACK button 234, a GO INTERACTIVE button 236, an EXIT button 238, and an INFO button 240. The MENU button 232 can be used to access a menu of features provided by the second set-top box device 124. Further, the INFO button 244 can be used to access an information window provided by the second set-top box device 124. The GO INTERACTIVE button 236 can be used to access interactive content provided by the IPTV system. The remote control device 128 can include a directional keypad 242. The directional keypad 242, the BACK button 234, and the EXIT button 238 can be used to navigate within the various content windows provided by the second set-top box device 124. The remote control device 128 can also include a triangular A button 244, a square B button 246, and a round C button 248. The A button 244, the B button 246, and the C button 248 can be used to make various selections when navigating within a menu screen, an information screen, or some other screen provided by the second set-top box device 124.

The remote control device 128 can further include a GUIDE button 250 that can be pressed in order to access an electronic programming guide for the content provided by the second set-top box device 124. Moreover, the remote control device 128 can include a volume (VOL) up/down button 252, a MUTE button 254, a channel/page (CH/PG) up/down button 256, and a LAST button 258. The VOL button 252 can be used to control the volume of the second set-top box device 124, a TV, a CD player, etc. The MUTE button 254 can be used to mute audio content provided by the second set-top box device 124, a TV, a CD player, etc. The CH/PG button 256 can be used to change the channel at the second set-top box device 124 or navigate from page-to-page within a content guide provided by the set-top box device. The LAST button 258 can be used to return to the last channel viewed by the user at the second set-top box device 124.

The remote control device 128 can include a numerical keypad 260 having a plurality of buttons that are individually numbered 1, 2, 3, 4, 5, 6, 7, 8, 9, and 0. The numerical keypad 260 is configured similar to a telephone keypad and each individual button also includes a portion of the alphabet. The 2 button includes ABC, the 3 button includes DEF, the 4 button includes GHI, the 5 button includes JKL, the 6 button includes MNO, the 7 button includes PQRS, the 8 button includes TUV, and the 9 button includes WXYZ. The 0 button can also be used as a SPACE button. In a particular embodiment, the numerical keypad 260 can be used to input a specific channel number. Further, the numerical keypad 260 can be used to input text to the IPTV system, when necessary, using the triple tap method well known in the art. The numerical keypad 260 can also include a DELETE button 262 and an ENTER/ZOOM button 264. Further details of the remote control device 128 are described in U.S. patent application Ser. No. 11/847,120, the disclosure of which is hereby incorporated by reference.

Figure 3:
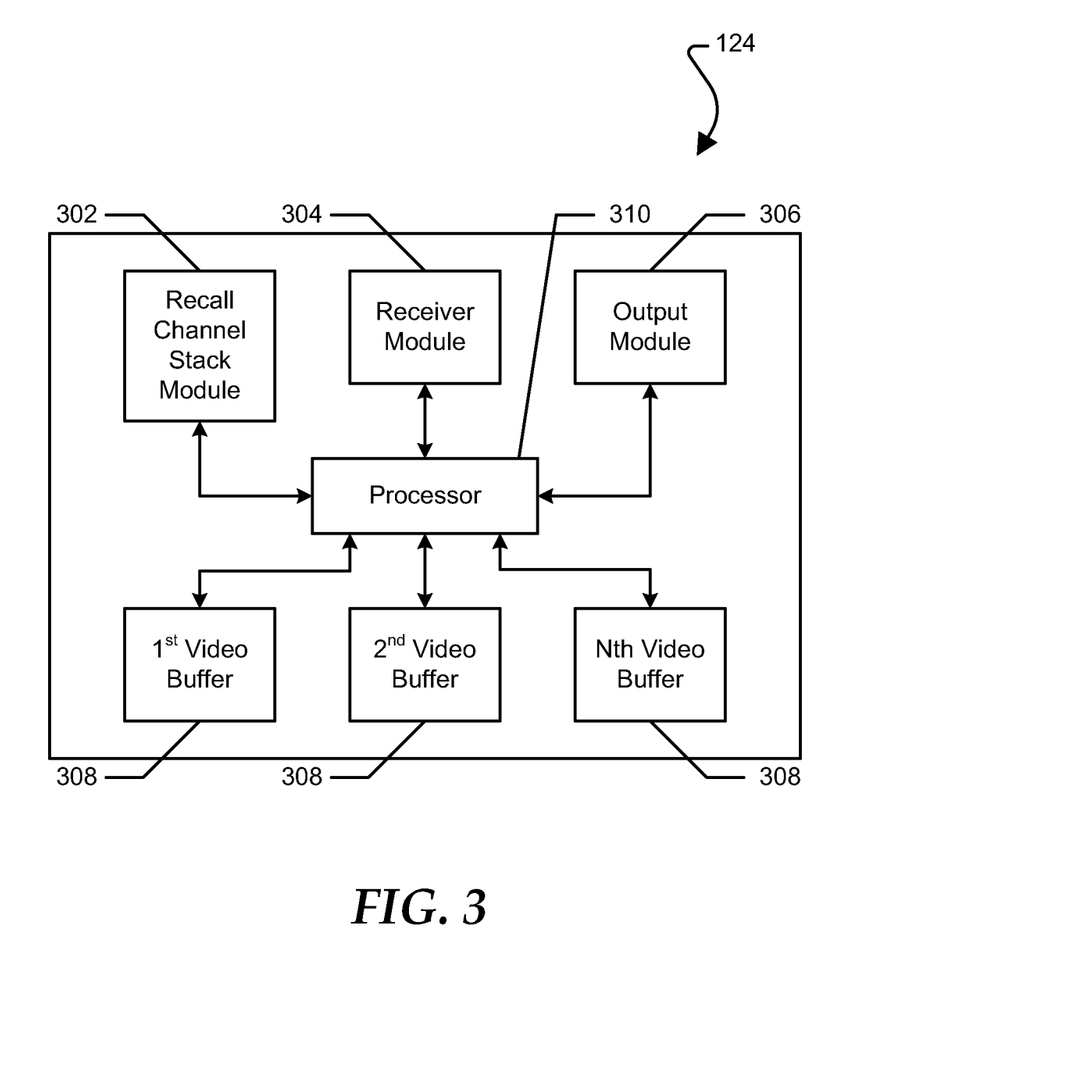
FIG. 3 is a block diagram of a plurality of components within a set-top box device.

FIG. 3 shows a block diagram of a plurality of components within the set-top box 124 including a recall channel stack module 302, a receiver module 304, an output module 306, a plurality of video buffers 308, and a processor 310. The recall channel stack module 302 is in communication with the receiver module 304 and with the output module 306 via the processor 310. The output module 306 is in communication with the channel video buffers 308 via the processor 310. The recall channel stack module 302 can store a configurable number of recently viewed or last channels to allow a user of the set-top box device 124 to cycle through the recently viewed channels on the display device 126. Additionally, the recall channel stack module 302 may allow the user to set a desired number of recently viewed channels to be stored in the recall channel stack module.

Figure 4:
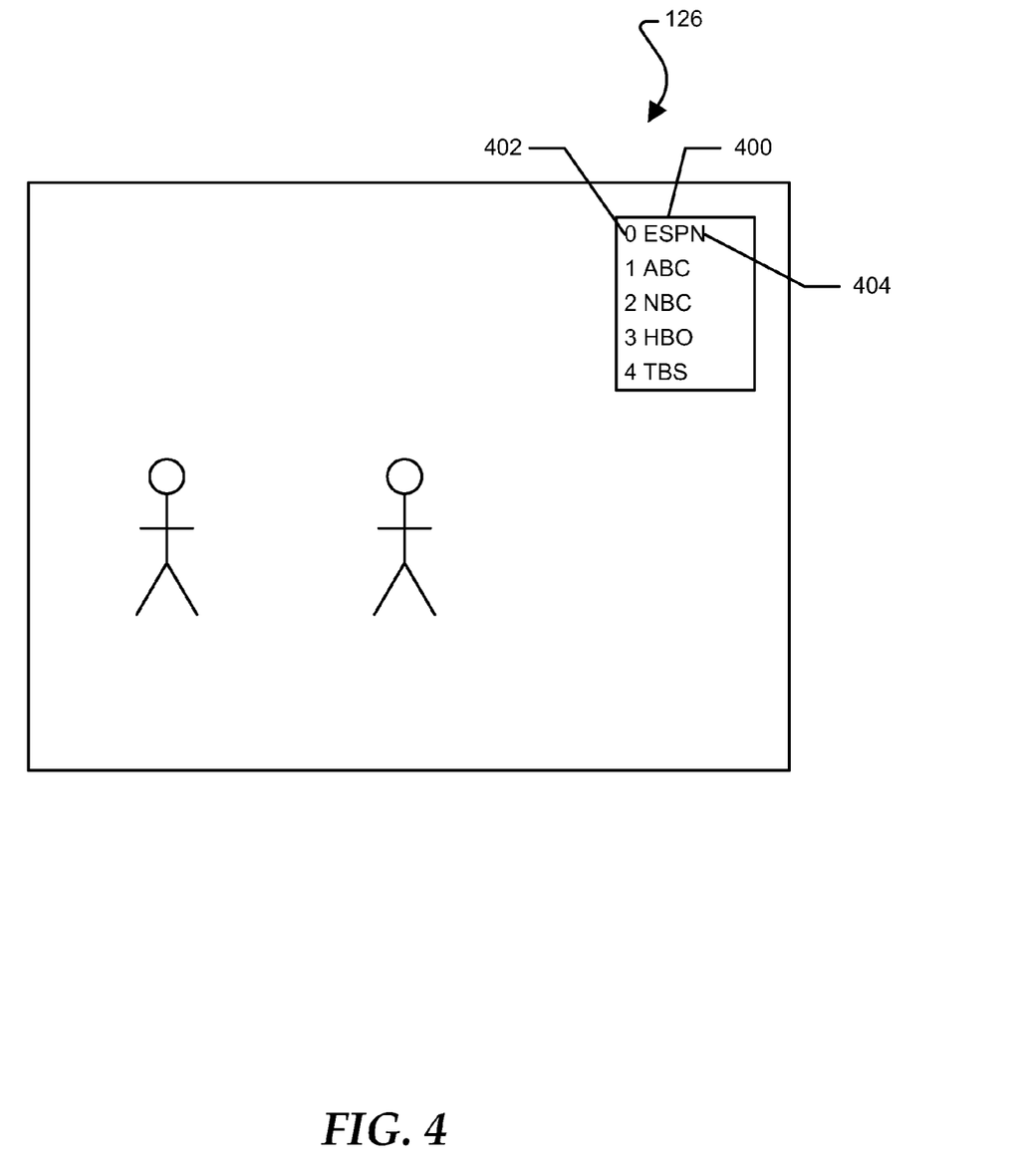
FIG. 4 is an exemplary screen shot of a display device with a last channel menu.

The receiver module 304 can receive control signals from the remote control device 128. The control signals can represent a last channel request, an advance backwards request, an advance forward request, and a clear request. The receiver module 304 can send each of the requests to the related module in the set-top box device 124. The output module 306 can send a video stream associated with one of the last channels to the display device 126, and can also send a last channel menu 400 including a selection number 402 and a television channel name 404 as shown in FIG. 4 to the display device. The last channel menu 400 can include any information related to each of the last channels stored in the recall channel stack module 302 and/or one of the video buffers 308. Additionally, the user may be able to select display information presented for each of the last channels in the last channel menu 400. The display information can be a channel number, the television channel name 404, an icon, and the like. Each of the video buffers 308 can store a video stream associated with one of the last channels of the recall channel stack module 302. The processor 310 can execute a plurality of instructions in the computer program 174 to perform the functions of the set-top box 124.

As the user changes the output of the display device 126 to a new television channel, the recall channel stack module 302 can store information related to the new television channel, such as the television channel number and the television channel name. Upon receiving a recall channel request from the user, the set-top box device 124 can use the information to output the television channel associated with the information to the display device 126. Additionally, if the recall channel stack module 302 is full, such that the total number of channels that can be stored has been reached, a least recently viewed channel may be deleted from the recall channel stack module before the new channel is stored. Also, when the new television channel is selected, one of the video buffers 308, such as the first video buffer, can start storing a video stream of content associated with the new television channel. The video stream for the new television channel can be stored in the video buffers 308 from the time that the channel is first viewed until the channel is no longer stored in the recall channel stack module 302. Thus, upon the channel being removed from the recall stack module 302, the associated video stream can also be deleted from the video buffers 308.

Each time that the user presses the last button 258 on the remote control device 128 as shown in FIG. 2, the recall channel stack module 302 can select the next channel stored in a recall channel stack and move the currently displayed channel to the bottom of the recall channel stack. For example, if the recall channel stack module 302 is set to store five last channels, the user can cycle through all of the last channels by pressing the last button 258 five times. Next, the recall channel stack module 302 can send the information associated with the next channel to the processor 310 so that the output module 306 can output the associated video stream to the display device 126. The user also can clear the recall channel stack module 302 by pressing and holding down the last button 258 for a predetermined amount of time. Additionally, the user can set the recall channel stack module 302 to output the last channel menu 400 as shown in FIG. 4 when the receiver module 304 receives a last channel request from the remote control device 128 indicating that the last button 258 was pressed. The user can then select one of the last channels by pressing the numeral on the keypad 260 that corresponds to the selection number 402 next to the channel name 404 of the desired last channel, such as '0' to view content on the ESPN channel.

Upon the receiver module 304 receiving the selection number 402 from the remote control device 128, the receiver module can forward the request to the processor 310. The output module 306 then can send the video stream associated a selected last channel to the display device 126. If the user has missed some content on the selected last channel while browsing through the other last channels, the user can press the rewind button 224 to access a portion of the video stream stored in one of the video buffers 308. The receiver module 304 can send the advance backwards request to the processor 310, and the processor can determine which of the video buffers 308 has the video stream associated with the selected last channel. The processor 310 can then send the video stream from the one of the video buffers 308 to the display device 126 via the output module 306. Thus, the user can cycle through the last channels, select one of the last channels from the last channel menu 400, and access missed portions of the last channels through the recall channel stack module 302, the receiver module 304, the output module 306, the video buffers 308, and the processor 310.

While the recalling of last channels has been described in related to television channels it should be understood that the last channels could be in any device receiving multiple channels, such as a radio. In the radio, the last channels can be the last radio frequency channels received and stored in a buffer. The user can switch between the last radio channels and can access portions of the last radio channels store in buffers of the radio.

Figure 5:
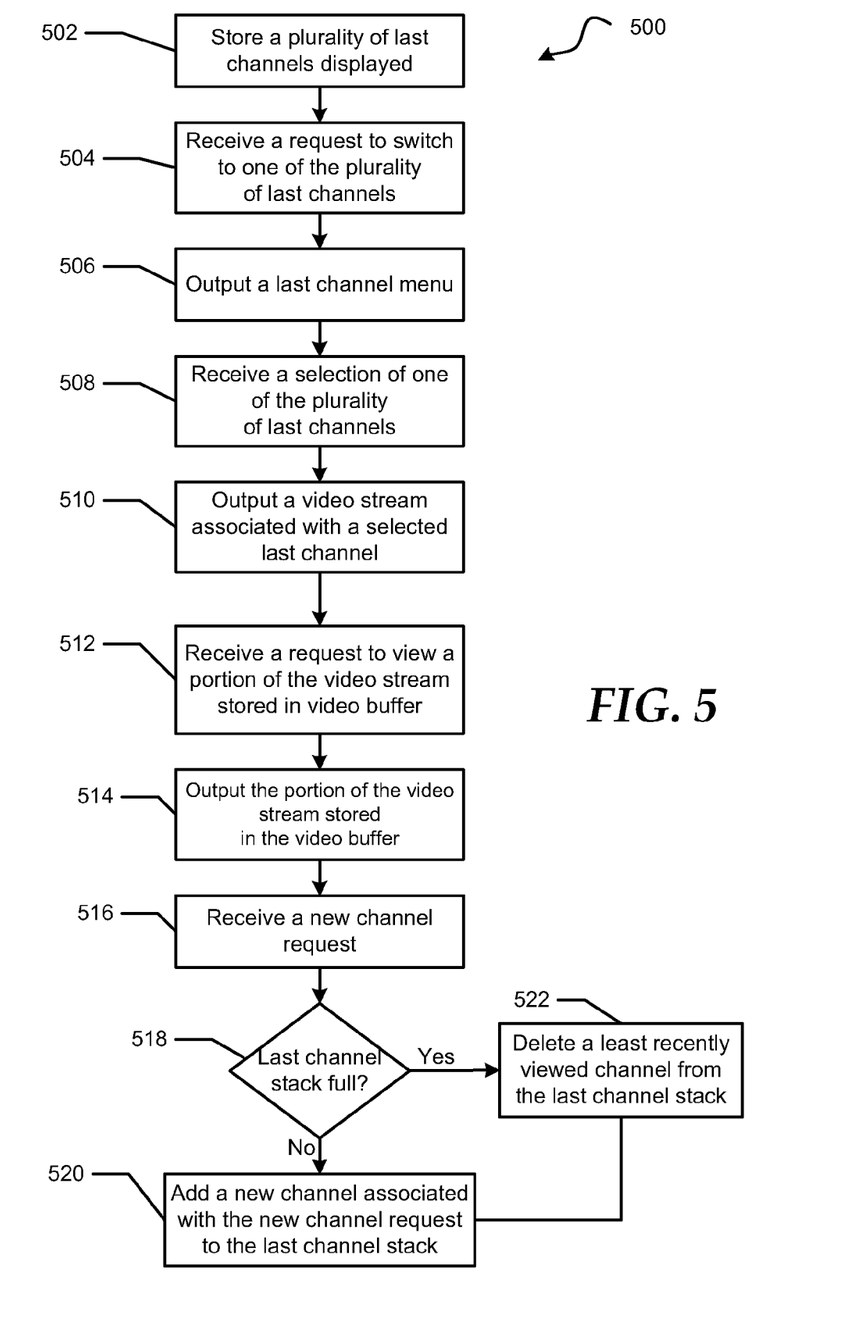
FIG. 5 is a flow diagram of a method for recalling one of a plurality of last channels.

The set-top box device 124 can allow a user to switch between a plurality of last channels. FIG. 5 shows a flow diagram of a method 500 for recalling one of a plurality of last channels. At block 502, a plurality of last channels displayed on a display device are stored in the set-top box device. A request to switch to one of the plurality of last channels is received at block 504. At block 506, a last channel menu is output. A selection of one of the plurality of last channels is received at block 508. At block 510, a video stream associated with a selected last channel is output.

At block 512, a request to view a portion of a video stream stored in a video buffer is received. The video stream is preferably associated with the selected last channel. The portion of the video stream stored in the video buffer is output at block 514. At block 516, a new channel request is received. A determination is made whether a recall channel stack is full at block 518. At block 520, if the recall channel stack is full, a least recently viewed channel in the recall channel stack is deleted. At block 522, a new channel associated with the new channel request is added to the recall channel stack. If the recall channel stack is not full, the new channel associated with the new channel request is added to the recall channel stack without deleting the least recently viewed channel.

Figure 6:
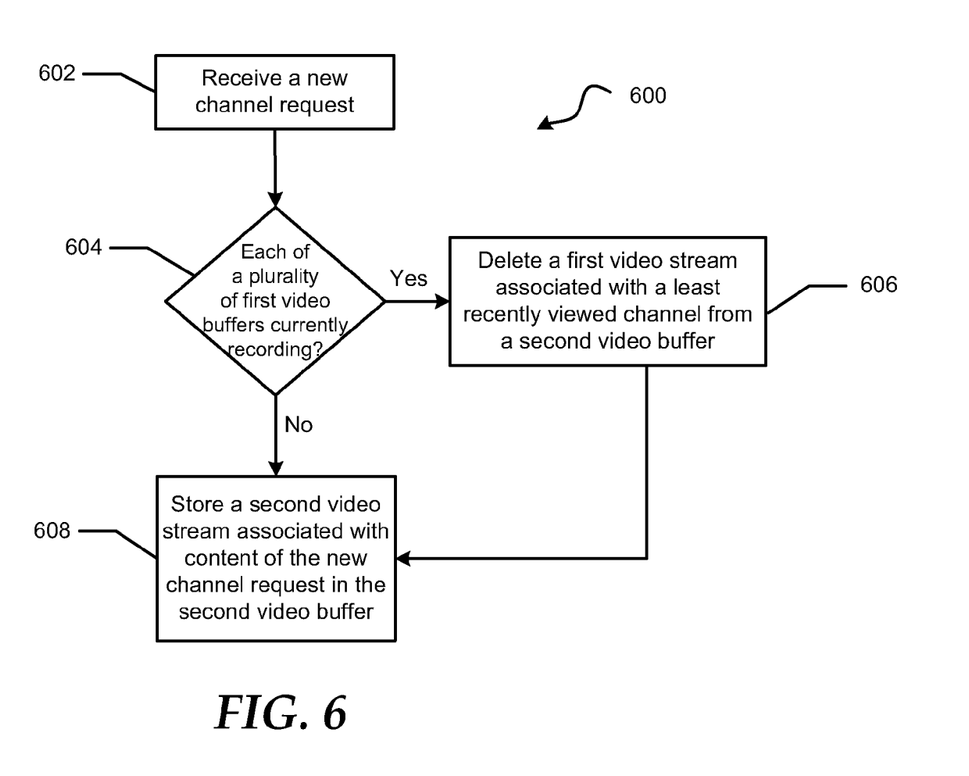
FIG. 6 is a flow diagram of a method for accessing a portion of a recorded video stream of a recall channel.

The set-top box device 124 can store a video stream, in one of the video buffers 308, associated with a television channel in the recall channel stack module 302. FIG. 6 shows a flow diagram of a method 600 for manipulating a video stream stored in one of a plurality of first video buffers. At block 602, a new channel request is received. A determination is made whether each of the plurality of first video buffers is currently recording a video stream at block 604. The video stream can be associated with one of a plurality of last channels stored in a recall channel stack. At block 606, if each of the plurality of first video buffers is currently recording a video stream, then a first video stream associated with a least recently viewed channel is deleted from a second video buffer. A second video stream associated with content of the new channel request is stored in the second video buffer at block 608. If each of the plurality of video buffers is not currently recording a video stream, then the second video stream associated with content of the new channel request is stored in the second video buffer without deleting the first video stream at block 608.

Figure 7:
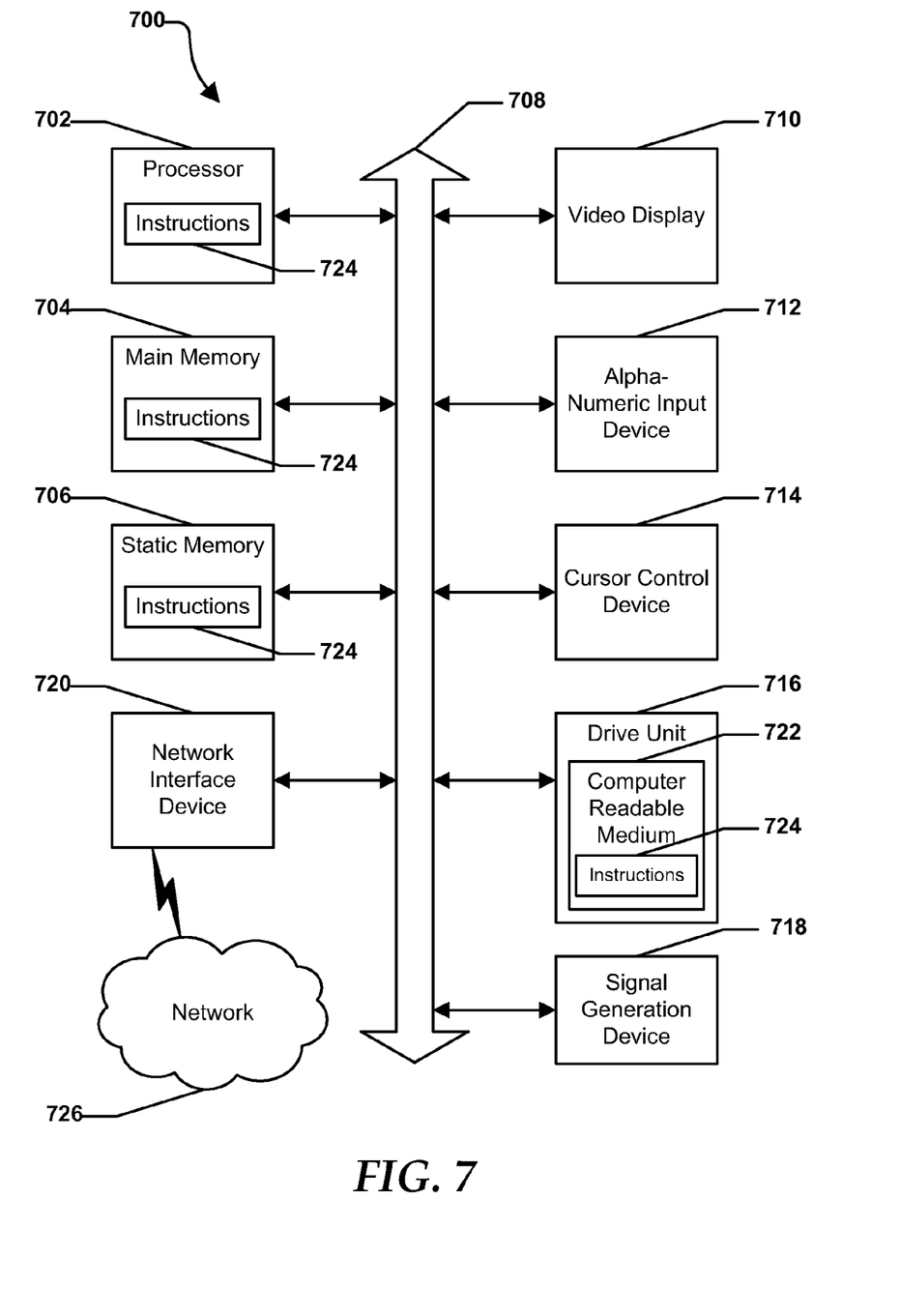
FIG. 7 is a block diagram of a general computer system.

FIG. 7 shows an illustrative embodiment of a general computer system 700 in accordance with at least one embodiment of the present disclosure. The computer system 700 can include a set of instructions that can be executed to cause the computer system to perform anyone or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT).

Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7 the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A set-top box device comprising:
    a memory to store instructions; and
    a processor communicatively coupled to the memory, wherein the processor, responsive to executing the instructions, performs operations comprising:
        receiving a first input indicating a first number, wherein the first number determines how many last channels of a plurality of last channels are presented in a last channel menu, wherein descriptive text entries are stored for each last channel of the last channel menu, and wherein each last channel of the last channel menu is available for recall;
        presenting the last channel menu;
        receiving a second input indicating a second number associated with a first channel from the last channel menu;
        presenting the first channel according to the second input;
        recording video content for each last channel of the last channel menu, wherein the video content for each last channel is recorded by a corresponding video buffer of a plurality of video buffers for a period beginning when the last channel is added to the last channel menu and ending when the last channel is deleted from the last channel menu;
        receiving a third input indicating a third number associated with a second channel of the last channel menu;
        presenting the second channel according to the third input;
        receiving a command to rewind recorded video content associated with the second channel;
        retrieving a portion of the recorded video content associated with the second channel from a video buffer according to the command to rewind, wherein the recorded video content was stored in the video buffer during the presenting of the first channel; and
        presenting the portion of the recorded video content associated with the second channel.

2. The set-top box device of claim 1, wherein the processor further performs operations comprising determining when a recall buffer is full, and replacing an oldest recall channel from the plurality of last channels displayed with a new channel when the recall buffer is full and when the set top box is tuned to the new channel.

3. The set-top box device of claim 2 wherein the processor further performs operations comprising replacing one of a plurality of first video streams associated with a least recently viewed channel of the plurality of last channels with a second video stream associated with a requested new channel that is not included in the plurality of last channels.

4. The set-top box device of claim 1 wherein the processor further performs operations comprising replacing a least recently viewed channel of the plurality of last channels with a new channel that is not included in the plurality of last channels based upon a new channel request.

5. A method comprising:
    receiving, by a system comprising a processor, an indication of a number of channels to recall;
    storing, by the system, text entries describing a plurality of last channels displayed, wherein the plurality of last channels displayed equals the number of channels to recall;
    receiving, by the system, a request to display a first channel of the plurality of last channels displayed;
    presenting, by the system, the first channel at a display
    outputting, by the system, a last channel menu listing the last channels displayed;
    recording, by the system, video content for each last channel of the last channel menu, wherein the video content for each last channel is recorded by a corresponding video buffer from when a corresponding recall of a plurality of video buffers for a period beginning when the last channel is added to the last channel menu and ending when the last channel is deleted from the last channel menu;
    receiving, by the system, a selection of a second channel of the last channel menu, wherein the request comprises a first number corresponding to a selection number for the second of the last channel menu;
    outputting, by the system, a video stream associated with the second channel;
    receiving, by the system, a command to rewind recorded video content associated with the second channel;

retrieving, by the system, a portion of the recorded video content associated with the second channel from a video buffer according to the command to rewind, wherein the recorded video content was stored in the video buffer during the presenting of the first channel; and presenting, by the system, the portion of the recorded video content associated with the second channel.

6. The method of claim 5 further comprising:
receiving, by the system, a new channel request;
determining, by the system, that a recall channel stack is full;
deleting, by the system, a least recently viewed channel from the recall channel stack; and
adding, by the system, a new channel associated with the new channel request to the recall channel stack.

7. The method of claim 6 wherein the indication of the number of channels to recall is set by a user.

8. The method of claim 5 further comprising:
receiving, by the system, a new channel request;
determining, by the system, that a recall channel stack is not full; and
adding, by the system, a new channel associated with the new channel request to the recall channel stack.

9. The method of claim 5 further comprising:
receiving, by the system, a new channel request;
determining, by the system, that each of a plurality of first video buffers of the plurality of video buffers is currently recording one of a plurality of first video streams, each being associated with one of the plurality of last channels displayed;
deleting, by the system, a first video stream associated with a least recently viewed channel from a second video buffer based on each of the plurality of first video buffers currently recording one of the plurality of first video streams; and
storing, by the system, a second video stream associated with content associated with the new channel request in the second video buffer.

10. The method of claim 9 wherein the plurality of first video buffers includes the second video buffer.

11. The method of claim 5 further comprising displaying a selection number and a television channel name for each of the plurality of last channels in the last channel menu.

12. The method of claim 5 further comprising displaying, by the system, information related to each of the plurality of last channels in the last channel menu.

13. The method of claim 5 further comprising allowing, by the system, a user to select display information for each of the plurality of last channels in the last channel menu.

14. The method of claim 13 wherein the display information is any information stored in a buffer associated with each of the plurality of last channels.

15. A method comprising:
receiving, by a system comprising a processor, an indication of a number of channels to recall;
storing, by the system, text entries describing a plurality of last channels displayed, wherein the plurality of last channels displayed equals the number of channels to recall;
receiving, by the system, a channel recall request;
outputting, by the system, a plurality of channel names each associated with one of the last channels displayed in response to the channel recall request;
recording, by the system, video content for each recall channel of the plurality of last channels displayed utilizing a plurality of video buffers, wherein the video content for each recall channel of the plurality of last channels displayed is recorded by a corresponding video buffer from when a corresponding recall channel is added to a last channel menu and is deleted from the corresponding video buffer when the corresponding recall channel is deleted from the last channel menu;
receiving, by the system, a selection of one of the plurality of channel names, wherein the selection comprises a first number corresponding to a selection number of a selected last channel of the last channel menu;
outputting, by the system, a video stream associated with a selected last channel;
receiving, by the system, a command to rewind recorded video content associated with the selected last channel:
retrieving, by the system, a portion of the recorded video content associated with the selected last channel from a video buffer according to the command to rewind, wherein the recorded video content was stored in the video buffer during the outputting of the video stream associated with the selected last channel; and
presenting, by the system, the portion of the recorded video content associated with the selected last channel.

16. The method of claim 15 wherein the video stream is stored in the video buffer while the selected last channel is stored in a recall channel stack.

17. The method of claim 15 further comprising:
receiving, by the system, a new channel request;
determining, by the system, that a recall channel stack is full;
deleting, by the system, a least recently viewed channel from the recall channel stack; and
adding, by the system, a new channel associated with the new channel request to the recall channel stack.

18. The method of claim 17 wherein the indication of the number of channels to recall is set by a user.

* * * * *